Dec. 21, 1948.  YU-YUEH A. MAO  2,456,973

TRACE BLANKING CIRCUIT FOR CATHODE-RAY OSCILLOSCOPES

Filed Oct. 10, 1945

INVENTOR
Y. A. MAO

BY *signature*

AGENT

Patented Dec. 21, 1948

2,456,973

UNITED STATES PATENT OFFICE 2,456,973

TRACE BLANKING CIRCUIT FOR CATHODE-RAY OSCILLOSCOPES

Yu-Yueh A. Mao, New York, N. Y., assignor to Bell Telephone Laboratories, Incorporated, New York, N. Y., a corporation of New York Application October 10, 1945, Serial No. 621,579

6 Claims. (Cl. 315—22)

This invention relates to an improvement in blanking circuits used with cathode ray oscilloscopes, especially adapted to suppress a desired portion of the cathode ray trace when a repetitive sweep voltage is either impressed on a pair of deflecting plates of the oscilloscope or produces a sweep current in a pair of magnetic deflection coils.

The general object of the invention is therefore to provide a circuit for suppressing a desired portion of a sweep trace on the screen of a cathode ray oscilloscope.

In the case of a sweep voltage of the usual sawtooth wave form, it is often desirable to limit the visibility of the trace to a part of the period of rising voltage, thereby excluding the appearance on the cathode ray screen of the return trace and perhaps also of the earliest and latest segments of the forward trace. An occasion for excluding one or both of those segments is the existence of non-linearity therein of voltage variation with time; other occasions for such exclusion will occur to those engaged in the art of television.

It is therefore a specific object of the invention to provide for a cathode ray oscilloscope a trace brightness control whereby the trace is allowed only during a selected portion of its forward movement to become visible on the oscilloscope screen.

In the circuit of the invention provision is made for delaying the revival of visibility of the trace for a desired fraction of its forward movement following the return trace.

It is thus another specific object of the invention to provide a trace blanking circuit for a cathode ray oscilloscope including means for delaying the unblanking of the trace for a desired initial period of a voltage producing the forward movement of the electron spot on the oscilloscope screen, as well as suppressing in the trace during the return of the spot.

Inasmuch as the circuit of the invention is responsive to voltage variations only, it is also an object of the invention to provide a trace blanking circuit for a cathode ray oscilloscope which shall be independent of the frequency or steepness of voltage variation of a repetitive sweep voltage controlling the trace.

The circuit of the invention and its operation relative to a saw-tooth sweep voltage will be understood from the following description, referring to the accompanying drawing in which.

Figure 1:
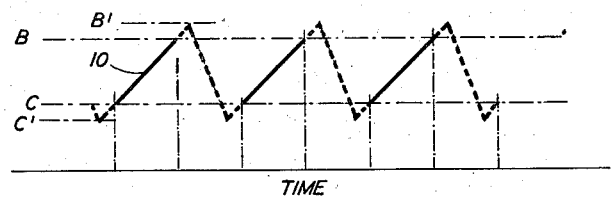
Fig. 1 is a diagram of a saw-tooth sweep voltage, with indication of the voltage levels thereof between which the sweep is allowed to appear on the screen of a cathrode ray oscilloscope.

Referring first to Fig. 1, the saw-tooth voltage wave 10 is a repetitive sweep voltage applicable, for example, to a pair of deflecting plates of a cathode ray oscilloscope. Horizontal lines B and C indicate respectively the maximum and minimum voltages in wave 10 between which values the cathode ray trace is to be rendered visible, with blanking of the return trace together with the portions C'C and BB' of the forward trace, where B' and C' are respectively, the maximum and minimum values of sweep voltage wave 10 itself.

Figure 2:
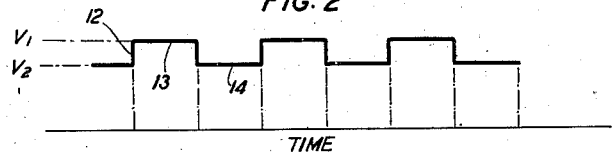
Fig. 2 is a diagram of the variation in voltage on the intensity grid of the oscilloscope in time relation to the limiting voltages shown in Fig. 1.

Fig. 2 shows in wave 12 the variation in voltage on the intensity grid of the oscilloscope required to produce the desired blanking of the trace. The intensity grid is at voltage $V_1$ during time intervals 13, at voltage $V_2$ during time intervals 14, the first voltage value corresponds to visibility of the trace, the second to suppression thereof.

Figure 3:
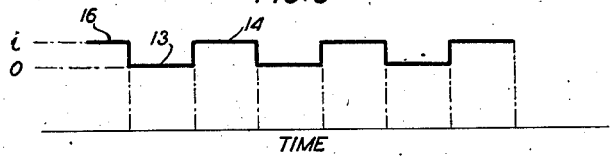
Fig. 3 is a diagram of the variation in the current in a gas tube used in the invention to produce the voltage variation of Fig. 2.

In the circuit described in connection with Fig. 4 a gas tube is used which is caused to become conducting during the blanking period 14 and to cease to conduct during the periods 13 of visible trace. In Fig. 3 the corresponding current wave 16 exhibits the variation of gas tube current between the value $i$ during periods 14 and zero during periods 13.

A common time scale is provided for Figs. 1, 2, and 3 and it will be noted that the successive grid voltage and gas tube current changes occur shortly after the start of the rising part of sweep voltage 10 and shortly before the start of the descending part thereof.

Figure 4:
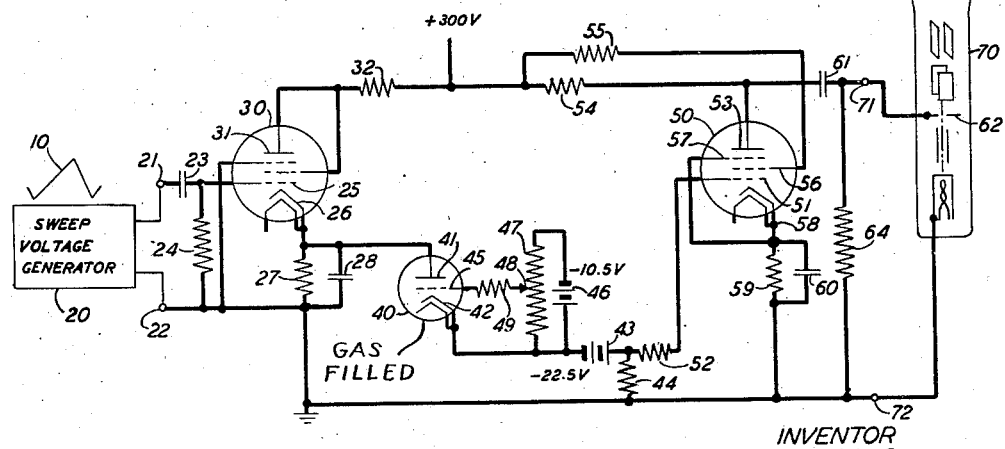
Fig. 4 is a diagram of the circuit of the invention.

Referring now to Fig. 4, a sweep voltage wave 10 is generated by generator 20, which may be of any known form of such devices, and is impressed across terminals 21, 22 of the circuit of the invention, terminal 22 being preferably grounded. The sweep voltage to ground at terminal 21 is passed through 0.5 microfarad condenser 23 to control grid 25 of pentode 30, suitably a 6AG7. Between ground and grid 25 is connected grid leak resistor 24 of about 390,000 ohms resistance. Cathode 26 of tube 30 is connected to ground through 470 ohm resistor 27 shunted by 0.25 microfarad condenser 28. Screen and suppressor grids of tube 30 are connected to anode 31 and to ground, respectively. Anode 31 is supplied through 100 ohm resistor 32 from +300 volts. Cathode heating is conventionally supplied by means not shown, for the several tubes of the circuit of Fig. 4.

Responsive to sweep voltage 10 on terminals 21 and 22 there appears a similar and nearly equal voltage across cathode resistor 27 of tube 30, but delayed with respect to voltage 10 by the effect of shunt condenser 28, of which the value stated is illustrative only and may be varied to produce a desired delay interval between the subsidences to minima of voltage 10 and of the cathode voltage.

Connected to cathode 26 at its junction with resistor 27 is anode 41 of gas tube 40, suitably an 884. For tube 40, cathode 42 is led to ground through −22.5 volt biasing battery 43 in series with resistor 44, about 8,200 ohms. Grid 45 of tube 40 is itself biased negatively to cathode 42 by a selected fraction of the voltage of −10.5 volt battery 46. Battery 46 is shunted by 100,000 ohm potentiometer 47, a tap 48 on which may be placed to give the desired bias to grid 45 through 8,200 ohm resistor 49.

Adjustment of tap 48 on potentiometer 47 determines the striking voltage of tube 40 which causes current to flow from anode 41 to cathode 42 and this adjustment of tap 48 determines the level B of sweep voltage 10 at which tube 40 shall become conducting. The voltage of battery 43 is adjusted either to the value stated or to a different value, as needed to fix the extinction voltage of tube 40 and so the level C of wave 10 at which the conductivity of tube 40 shall cease. The levels B and C are thus independently varied, and the times of attainment of the corresponding voltages across resistor 27 are adjustably delayed with respect to wave 10 by the choice of shunt condenser 28.

Current flow in tube 40 is thus confined to the intervals 14, Fig. 3. During this interval the voltage on the intensity grid of the cathode ray oscilloscope is to be reduced to blank the trace on the oscilloscope screen.

It will be recognized that the function of tube 30 is chiefly that of isolating the sweep voltage generated from tube 40 and the remainder of the circuit now to be described.

The current flowing in tube 40 is independent of the voltage at anode 41 until this voltage sinks to the extinction value for the tube. During such current flow, the path of which to ground includes resistor 44, there obtains across that resistor a voltage, positive to ground, which is used to make conducting tube 50, a 6AC7.

Control grid 51 of tube 50 is through resistor 52 (about 330,000 ohms) supplied with voltage positive to ground from the junction of battery 43 and resistor 44. Anode 53 is supplied from +300 volts through 6800 ohm resistor 54, while from the 300 volt source through 60,000 ohm resistor 55 voltage is supplied to screen grid 56 of tube 50. Suppressor grid 57 and cathode 58 are connected to ground through 330 ohm resistor 59 shunted by condenser 60 of large capacitance, say 125 microfarads.

During intervals 14, Figs. 2 and 3, when tube 40 is conducting and the oscilloscope trace is to be blank, the positive voltage fed to grid 51 of tube 50 makes that tube conducting. This conferred (or increased) conductivity of tube 50 entails a voltage drop at anode 53 thereof, a drop which is transmitted through 0.5 microfarad condenser 61 to intensity grid 62 of cathode ray oscilloscope 70. Output terminals 71 and 72, the latter to ground, are shunted by 1 megohm resistor 64 connected between ground and the terminal of condenser 61 remote from anode 53.

It will be understood that the showing of oscilloscope 70 is symbolic only, the conventional supply circuit being assumed, but not shown. When the voltage at anode 53 is reduced in the time intervals 14, that of intensity grid 62 is reduced to the value at which the cathode ray trace is blanked, returning to its normal value during intervals 13 to cause the trace to reappear.

From the foregoing description, it will be clear that the invention provides a blanking circuit for the described purpose, whether the varying voltage producing the cathode ray sweep is of saw-tooth form or not. By selection of the voltage of battery 43, Fig. 4, the operator fixes the value of the varying voltage at which the cathode ray trace shall become visible, and by adjustment of tap 48 on potentiometer 47, he fixes the value of that voltage at which the trace shall disappear. These voltage values are thus independent, one of the other, and the appearance of the trace may, by suitable choice of the capacitance of condenser 28, be delayed a desired time interval with respect to the minimum of the varying voltage.

It will be understood that the specific components and magnitudes recited in describing the circuit of Fig. 4 are those used in a particular assembly and that the invention is not limited thereto.

What is claimed is:

1. In an electrical circuit including a cathode ray oscilloscope provided with a screen on which an electron spot moves in accordance with a repetitive voltage, said spot varying in intensity in accordance with a control voltage, means responsive to the repetitive voltage for varying the control voltage to extinguish the spot during an interval of the repetitive voltage and means for controlling the responsive means to define the interval.

2. In a cathode ray oscilloscope provided with a control grid and a screen on which an electron spot moves in accordance with a repetitive voltage, said spot varying in intensity in accordance with the voltage of the control grid, electrical means for controlling the intensity of the spot including means for producing from the repetitive voltage a second voltage similar thereto and electrically isolated therefrom, means responsive to the second voltage for producing a voltage of square wave form and means for impressing the square wave voltage negatively on the control grid.

3. Electrical means as in claim 2 including means for producing a desired time delay of the square wave voltage relative to the repetitive voltage.

4. A trace blanking circuit for a cathode ray oscilloscope provided with a control grid and a screen on which an electron spot moves in accordance with a controlling voltage of saw-tooth wave form, said spot varying in intensity with the voltage of the control grid, comprising electrical means responsive to the controlling voltage for producing a second saw-tooth voltage, means responsive to the second voltage for producing a voltage of square wave form having its higher value coexistent with a selected interval of the controlling voltage, means for controlling the last-named responsive means to select the interval, means for reversing in phase the square wave voltage and means for impressing the reversed square wave voltage on the control grid, thereby blanking the spot during the selected interval.

5. A trace blanking circuit as in claim 4 including means for retarding the phase of the second saw-tooth voltage relatively to the controlling voltage.

6. In a circuit comprising a cathode-ray oscilloscope provided with a screen on which an electron spot moves in accordance with a repetitive voltage, means responsive to said voltage for extinguishing the spot between two selected values of said voltage and means controlling said responsive means to select said values.

YU-YUEH A. MAO.

REFERENCES CITED

The following references are of record in the file of this patent:

UNITED STATES PATENTS

| Number | Name | Date |
|---|---|---|
| 2,222,943 | George | Nov. 26, 1940 |
| 2,313,967 | Read, Jr. | Mar. 16, 1943 |
| 2,355,363 | Christaldi | Aug. 8, 1944 |
| 2,375,709 | Thompson | May 8, 1945 |
| 2,415,870 | De Ryder | Feb. 18, 1947 |
| 2,425,330 | Kenyon | Aug. 12, 1947 |